United States Patent [19]

Tsujiuchi et al.

[11] Patent Number: 4,910,561
[45] Date of Patent: Mar. 20, 1990

[54] METHOD AND APPARATUS FOR DETECTING PROFILE ERROR OF ARTICLE SURFACE

[75] Inventors: Junpei Tsujiuchi, Kawasaki; Toshio Honda, Yokohama; Zenji Wakimoto, Suita; Mitsuo Suzuki, Ikoma, all of Japan

[73] Assignee: Osaka Seimitsu Kikai Co., Ltd., Osaka, Japan

[21] Appl. No.: 202,609

[22] Filed: Jun. 6, 1988

[30] Foreign Application Priority Data

Oct. 30, 1987 [JP] Japan .............................. 62-273492

[51] Int. Cl.⁴ ................................................ G01B 9/02
[52] U.S. Cl. ...................................... 356/347; 356/358
[58] Field of Search .................. 356/347, 358; 350/3.6, 350/3.77

[56] References Cited

U.S. PATENT DOCUMENTS 3,735,036  5/1973  Macovski .
3,837,726  9/1974  Suzuki et al. ........................ 356/347
4,197,010  4/1980  Meyrueis et al. .
4,624,568  11/1986  Bartolomeo ........................ 350/3.77
4,657,396  4/1987  Honda et al. .

Primary Examiner—Vincent P. McGraw
Assistant Examiner—S. A. Turner
Attorney, Agent, or Firm—Armstrong, Nikaido, Marmelstein, Kubovcik & Murray

[57] ABSTRACT

An optical non-contact detection of profile errors of a surface or surfaces of an article, such as an industrial product is carried out by a coherent signal bea of light introduced along an imaginary plane and projected onto the surface of the article at a large angle of incidence. The signal beam of light is reflected from the surface toward the same imaginary plane and traveled past optical system toward a photosensitive material on which a separate reference beam of light is projected. A hologram of the surface is formed on the photosensitive material, which is used for an analysis of the profile errors of the surface.

18 Claims, 11 Drawing Sheets

METHOD AND APPARATUS FOR DETECTING PROFILE ERROR OF ARTICLE SURFACE

BACKGROUND OF THE INVENTION

1. Field of the Invention

The present invention relates to a method and apparatus for optically detecting profile errors on a surface of various three-dimensional articles, especially industrial products such as a gear, with respect to the desired profile of a reference surface, by using a coherent beam of light such as a laser beam, and more particularly, it relates to an optical profile error detecting method and an apparatus for carrying out the same, capable of efficiently detecting and measuring profile errors in a plurality of successive inspected surfaces arranged at intervals, such as the flanks of teeth of a gear.

2. Description of the Related Art

A method of three-dimensionally detecting errors in the profile of an inspected article by using a laser beam is disclosed in, for example, U.S. Pat. No. 4,657,396 to Honda et al. In the known method, a laser beam is projected onto the surface of an inspected article at a large angle of incidence, the hologram of a reference surface is irradiated only by the regularly reflected beam of light of the laser beam, the plus first order diffracted wave is focused, the focused condition of the plus first order diffracted beam of light is detected by a photoelectric detecting element, and the profile errors in the surface of the inspected article are measured and detected by analyzing the output signal of the photoelectric detecting element. When the surface of the inspected article is finished by machining, the degree of roughness of such a machined surface is considerably high from the optical point of view, even if the surface is finished to a high precision, and such a machined surface causes light to scatter and makes it difficult to form a hologram. Accordingly, in the foregoing known method, the laser beam is projected at a large angle of incidence on the surface of the inspected article to increase the amount of specularly reflected beam of light by the well-known sheen effect.

However, the foregoing conventional optical profile error detecting method is strictly theoretical and is not practical in application to the measuring and detecting of profile errors on the surface of a detected object or article in industrial manufacture and inspection. For example, a practical constitution of an optical profile error detecting apparatus capable of projecting a signal light beam on a tooth surface at a large angle of incidence and obtaining a specularly reflected beam of light, for efficiently detecting profile errors in the tooth-flanks, for example, of an involute gear by comparing the actual profiles of the tooth-flanks with an ideal involute tooth-flank has not been disclosed. Although the present invention is not limited to the detection of profile errors in the tooth surfaces of gears, it has particularly been desired to develop an optical profile error detecting method and an optical profile error detecting apparatus capable of efficiently detecting errors in the tooth-surfaces of gears including helical gears and skew gears each having a plurality of gear teeth arranged at regular angular intervals.

SUMMARY OF THE INVENTION

An object of the present invention is to provide an optical profile error detecting method and an optical profile error detecting apparatus capable of solving the problems encountered by the afore-mentioned optical profile error detecting method.

Another object of the present invention is to provide an optical profile error detecting method and an optical profile error detecting apparatus capable of efficiently detecting profile errors in a plurality of detected surfaces of a detected object, such as a gear.

A further object of the present invention is to provide an optical profile error detecting method and an optical profile error detecting apparatus capable of projecting a signal light beam on each of a plurality of detected surfaces arranged successively with a small gap therebetween to obtain a sufficient quantity of specularly reflected light beam by the sheen effect, and capable of forming the hologram of the detected surface to facilitate the detection of profile errors in the detected surface with respect to a reference surface.

A still further object of the present invention is to provide an optical profile error detecting method and an optical profile error detecting apparatus capable of continually detecting profile errors in a plurality of detected surfaces.

In accordance with one aspect of the present invention, there is provided a method of detecting profile errors of at least one surface of an article to be inspected with respect to a preselected profile of a reference surface by the use of an inspection light emitted from a light source. The method comprises the steps of:

- separating a beam of the inspection light into a signal beam of light and a reference beam of light;
- forwarding the reference beam of light toward a predetermined light sensitive material disposed at a fixed position;
- forwarding the signal beam of light to the vicinity of the inspected surface by traveling along an imaginary plane facing the inspected surface with a space therebetween under the guide of a first optical system;
- changing the direction of travel of the signal beam of light within the space toward a direction perpendicular to the imaginary plane by either a reflection or refraction of light conducted by a second optical system thereby permitting the signal beam of light to fall on the detected surface at a large angle of incidence;
- passing the signal beam of light after reflection from the inspected surface through a third optical system which causes the signal beam of light to change the direction of travel of light by either a reflection or refraction of light toward a direction lying on the same imaginary plane as the first mentioned imaginary plane;
- projecting the signal beam of light traveling along the imaginary plane after passing through the third optical system on the light receiving material disposed at the fixed position under the guidance of a fourth optical system; and
- forming a hologram of the inspected surface on the light receiving material through the interference between the signal beam of light and the reference beam of light which are projected on the light receiving material, the hologram being used for detecting the profile errors of the inspected surface.

In accordance with another aspect of the present invention, there is provided an apparatus for detecting profile errors of at least one surface of an article to be inspected with respect to a reference surface having a preselected profile. The apparatus comprises in combination:

light source means for emitting a coherent inspecting beam of light;

means for optically separating the inspecting beam of light into a reference beam of light and a signal beam of light;

light receiving material means removably arranged at a predetermined position adapted to receive the reference beam;

means for removably holding the inspected article having the surface to be subjected to a profile error detecting at a predetermined inspection position;

first optical system means for allowing the signal beam of light to travel along an imaginary plane facing the surface of the inspected article with a space therebetween from said means for optically separating the inspecting beam to the vicinity of the inspected surface;

second optical system means for causing a change in a direction of travel of the signal beam of light by either an optical reflection or refraction within the space toward a direction perpendicular to the imaginary plane thereby allowing the signal beam of light to fall onto the surface of the inspected article at a large angle of incidence;

third optical system means for passing therethrough the signal beam of light specularly reflected from the surface of the inspected article so as to cause a change in a direction of travel of the specularly reflected signal beam of light by either an optical reflection or refraction toward a direction of travel along the imaginary plane; and fourth optical system means for projecting the specularly reflected signal beam of light passing through the third optical system onto the light receiving material means thereby forming a hologram of the surface of the inspected article on the light receiving material by an optical interference between the specularly reflected signal beam of light and the reference beam of light, the hologram being used for detecting the profile errors.

BRIEF DESCRIPTION OF THE DRAWINGS

The above and other objects, features and advantages of the present invention will be more apparent from the ensuing description of the embodiments of present invention with reference to the accompanying drawings wherein.

DESCRIPTION OF THE PREFERRED EMBODIMENTS

Figure 1:
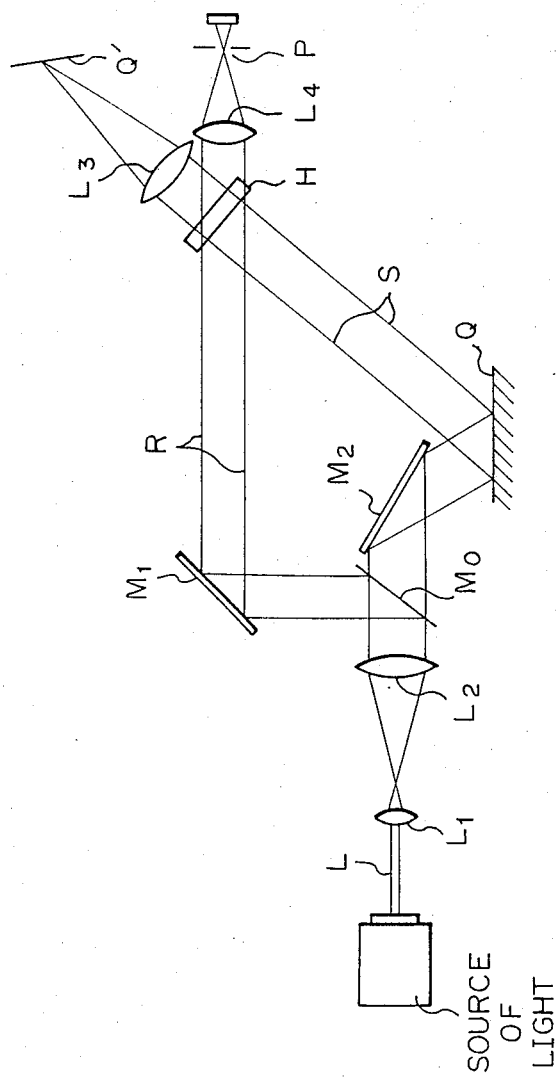
FIG. 1 is a schematic view of a profile error detecting system for explaining a known principle of detecting profile errors of a detected surface by the employment of a coherent beam of light.

FIG. 1 illustrates a basic principle of the operation of a profile error detection on which is based a method of detecting the difference in profile of an inspected surface of an article from an analogous reference surface by using a reference hologram of the reference surface produced by a coherent beam of light, and a hologram of the inspected surface produced by using the coherent beam of light.

Referring to FIG. 1, a coherent beam of light L emitted from a light source is diverged and expanded by lenses $L_1$ and $L_2$ and is separated into a reference beam of light R and a signal beam of light S by a half mirror $M_0$. The reference light beam R is reflected by a total reflection mirror $M_1$ on a light receiving material or a photosensitive material H held at a predetermined and fixed position to form a hologram thereon. The signal light beam S is reflected by a total reflection mirror $M_2$ on a surface Q of an article to be inspected, such as an industrial product. A specularly reflected light beam reflected from the inspected surface Q falls on the photosensitive material H held at the fixed position. Thus, a hologram containing the profile information of the inspected surface Q is formed on the photosensitive material H by superimposing the reference light beam R and the signal light beam S reflected from the inspected surface Q of the article. Note, when the inspected surface Q is a reference surface selected beforehand from a plurality of analogous inspected surfaces Q, the hologram formed on the photosensitive material H can be used as a reference hologram.

After forming the reference hologram of the reference surface Q on the photosensitive material H, the reference hologram is placed at the fixed position, and the reference surface Q is then replaced by an inspected surface Q to be compared with the selected reference surface Q, and then the reflected signal light beam S reflected from the inspected surface Q is transmitted through the reference hologram to focus the image of the inspected surface Q by a focusing lens $L_3$ on an image plane Q'. As a result, interference fringes are formed on the image plane Q' by the optical interference between a light beam diffracted by the reference hologram and the reflected light beam transmitted through the hologram. Profile errors in the inspected surface Q with respect to the reference surface Q are detected by an optical analysis of the interference fringes.

According to the principle of the profile error detecting method disclosed in U.S. Pat. No. 4,657,396, the specularly reflected light beam of the signal light beam reflected from the inspected surface Q is projected onto the reference hologram instead of forming the interference fringes, then the reference hologram emits a first order diffracted light beam. The first order diffracted light beam is then condensed by a condenser lens $L_4$, and then the amount of light passed through a pin-hole P is measured to detect the profile error of the inspected surface Q.

The method disclosed in U.S. Pat. No. 4,657,396 is characterized by projecting the signal light beam on the inspected surface at a large angle of incidence to utilize the sheen effect, to enable the detection of profile errors in a machined surface, which is regarded as a rough surface from the optical point of view, such as a tooth flank of a gear. However, U.S. Pat. No. 4,657,396 does not disclose the constitution of an optical mechanism practically applicable to obtain the specularly reflected light beam by separating a coherent light beam, such as a laser beam, emitted from the light source into the reference light beam and the signal light beam and projecting the signal light beam on the inspected surface at a known large angle of incidence.

Accordingly, the present invention has been created to realize the practical detection of profile errors in a surface of a three dimensional article to be inspected.

Figure 2:
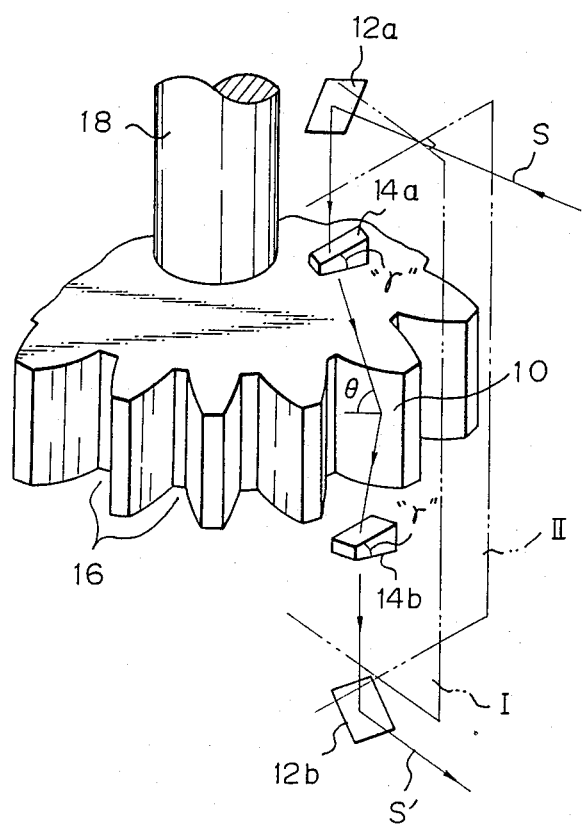
FIG. 2 is a schematically perspective view of a profile error detecting system for explaining the principle of projecting a signal beam of light onto a detected surface at a large angle of incidence and the principle of detecting the signal beam of light, which are most essential to the method and apparatus for detecting profile errors of an object, according to the present invention.
Figure 3:
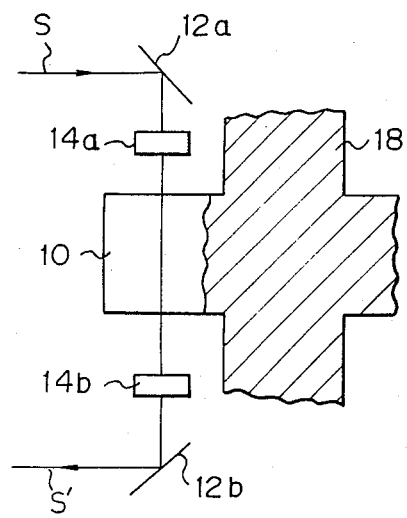
FIG. 3 is a cross-sectional view taken along a plane I in FIG. 2.
Figure 4:
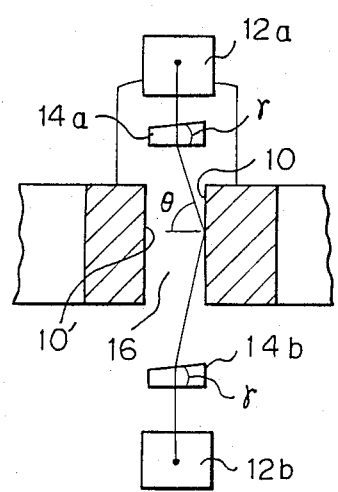
FIG. 4 is a cross-sectional view taken along another plane II in FIG. 2.

FIG. 2 is a schematic perspective view to explain a manner of projecting a signal light beam onto an inspected surface at a large angle of incidence to obtain a reflected light according to an optical profile error detecting method of the present invention, and FIGS. 3 and 4 are sectional views taken on imaginary planes I and II, respectively, indicated by alternate long and two short dashes lines in FIG. 2. In this case, by way of example, the inspected surface is a tooth surface of a gear.

Referring to FIGS. 2 through 4, a coherent light beam, for example, a laser beam, emitted from a light source, not shown, is separated into a reference beam of light R, not shown, and a signal beam of light S, and then the signal light beam S is made to travel along the imaginary plane I facing an inspected tooth surface 10 to a position directly above the inspected tooth surface 10. The signal light beam S is then deflected within the imaginary plane I, for example, by a total reflection mirror 12a toward a position in the vicinity of the inspected tooth surface 10 to facilitate projecting the signal light beam S onto the tooth surface 10 to be inspected. The signal light beam S is subsequently refracted by an optical element, such as a deflecting prism 14a, so that the direction of travel thereof is changed from the direction lying in the imaginary plane I toward a direction along another imaginary plane II which is perpendicular to the imaginary plane I, and then the signal light beam S is projected at a desired position on the inspected tooth surface 10, at a large angle $\theta$ of incidence. The deflecting prism 14a must be finished so that the two adjacent parallelogrammatic faces thereof meet each other accurately at a vertex angle $\gamma$, to allow the deflected signal light beam S to fall on the inspected tooth surface at a known large angle $\theta$ of incidence and enable the use of the sheen effect. The signal light beam S is then reflected from the inspected tooth surface 10. The reflected signal light beam S passes through and is deflected by a deflecting prism 14b, i.e., the pair to the deflecting prism 14a, so as to again travel along the imaginary plane I, and then the deflected signal light beam S is reflected within the imaginary plane I, for example, by a total reflection mirror 12b to obtain a reflected signal light beam S'. The reflected signal light beam S' is projected, together with the reference light beam R traveling through the other non-illustrated optical pass, onto a photosensitive material (not illustrated), held at a fixed position, such as mentioned with reference to the mechanism shown in FIG. 1 embodying the hologram producing principle, to produce the hologram of the inspected tooth surface 10.

According to the arrangement illustrated in FIGS. 2 through 4, the signal light beam S can be projected on the inspected tooth surface 10 exactly at the large angle $\theta$ of incidence. That is, the signal light beam S can be easily made to travel along the imaginary plane I even into the tooth space 16 between the two adjacent gear teeth of a gear having a plurality of gear teeth, and then the signal light beam S can be reflected or refracted within the imaginary plane II perpendicular to the imaginary plane I to make the signal light beam S fall exactly on the inspected tooth surface 10 at the large angle $\theta$ of incidence. Thus, the tooth surfaces of the gear teeth can be sequentially located at the position of the inspected tooth surface 10 by turning the gear on the rotary shaft 18 to subject respective tooth surfaces successively to the profile error detection. Furthermore, the signal light beam S can be easily projected on the inspected tooth surface 10 regardless of whether the inspected tooth surfaces 10 are located far from or adjacent to the rotary shaft 18, without entailing mechanical interference between the optical system including the total reflection mirrors 12a and 12b and the deflecting prisms 14a and 14b, and the gear per se and the rotary shaft 18, by shifting the optical system or the gear along the imaginary plane I containing the signal light beam S and the reflected signal light beam S' according to the size of the gear.

On the other hand, according to the arrangement illustrated in FIGS. 2 through 4, in detecting profile errors in the tooth surfaces of a gear as illustrated in FIGS. 2 through 4, the signal beam of light S can be projected at the large angle $\theta$ of incidence on a tooth surface 10' (FIG. 4) opposite to the inspected tooth surface 10 with respect to the tooth space 16, and the reflected signal light beam S' can be made to travel along the same original plane I when the respective directions of refraction and deflection of the deflecting prisms 14a and 14b are made opposite to each other within the imaginary plane II. Thus, the profile error detection of the tooth surface 10' can be easily achieved. A practical arrangement and construction of the deflecting prisms 14a and 14b respectively for refracting and deflecting the signal light beam in opposite directions will be described in the following examples.

1) The signal light beam S is separated into two parallel signal beams of light, i.e., into a first signal light beam S and a second signal light beam S, before entering the deflecting prism 14a on the side of incidence so that the first and second signal light beams S travel along two parallel imaginary planes I. The first and second light signal beams S are projected on the opposite inspected tooth surfaces 10 and 10' by two sets of paired deflecting prisms 14a and 14b, respectively. Thus, the respective holograms of the two detected tooth surfaces 10 and 10' can be successively produced or profile errors in the two inspected tooth surfaces 10 and 10' can be successively detected.

Figure 5:
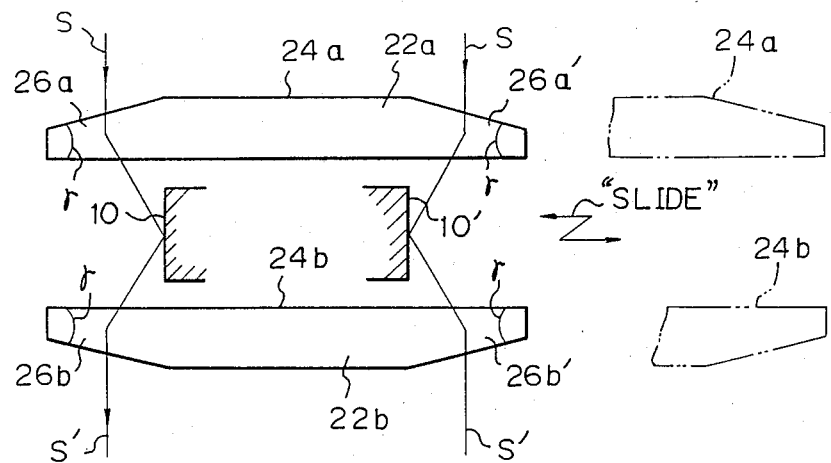
FIG. 5 is a schematic view of a prism arrangement for deflecting a signal beam of light coming from a single light source by a refraction of the light in opposite directions, according to an embodiment of the present invention.

(2) Referring to FIG. 5, two combined deflecting prisms 24a and 24b are arranged above and below, viewed in FIG. 5, of the inspected tooth surfaces 10 and 10' instead of the afore-mentioned deflecting prisms 14a and 14b. The combined deflecting prism 24a (24b) comprises a flat section 22a (22b) having parallel upper and lower faces, and deflecting prism sections 26a and 26a' (26b and 26b') each having two parallelogrammatic faces extending at the vertex angle $\gamma$ to each other and respectively joined to the opposite ends of the flat section 22a (22b) in opposite directions. When the combined deflecting prisms 24a and 24b are integrated in a single prism assembly capable of sliding in a direction perpendicular to the afore-mentioned imaginary plane I (not illustrated in FIG. 5), the hologram of the detected tooth surface 10 can be produced or profile errors in the inspected surface 10 can be detected by employing the signal light beam S and the deflecting prism sections 26a and 26b, and the hologram of the opposite inspected tooth surface 10' can be produced or profile errors in the inspected tooth surface 10' can be detected by employing the same signal light beam S and the opposite deflecting prism sections 26a' and 26b'.

Figure 6:
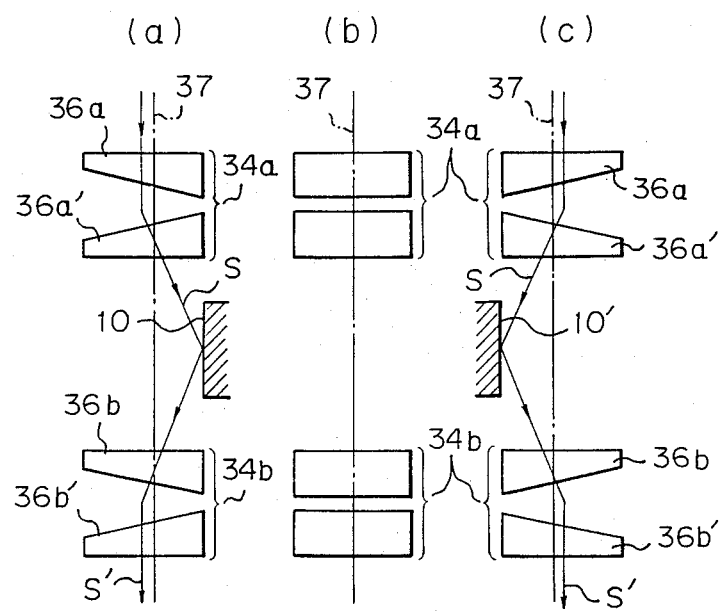
FIG. 6 is a schematic view of an another prism arrangement for deflecting a signal beam of light coming from a single light source by a light refraction, according to another embodiment of the present invention.

(3) Referring to FIG. 6, a prism assembly 34a comprising a pair of deflecting prisms 36a and 36a' is arranged above the inspected tooth surface 10, and another prism assembly 34b comprising a pair of deflecting prisms 36b and 36b' is arranged below the inspected tooth surface 10. Further, the prism assemblies 34a and 34b are constructed so that both assemblies are synchronously turned about a vertical axis 37. When the prism assemblies 34a and 34b are located at a position (a), the signal light beam S is deflected and projected onto the inspected tooth surface 10 at a large angle of incidence, for specular reflection. Subsequently, when the prism assemblies 34a and 34b are turned about the vertical axis 37 from the position (a) through an angle of 180° through a position (b), at which the prism assemblies 34a and 34b arrive when turned through an angle of 90°, to a position (c), the signal light beam S is deflected in a direction opposite to the direction of deflection when the prism assemblies 34a and 34b are located at the position (a), and thus the signal light beam can be projected onto the inspected tooth surface 10' for reflection. The angle of incidence can be continuously varied between $+\theta$ and $-\theta$ by turning the deflecting prisms 36a and 36a' of the prism assembly 34a relative to each other about the vertical axis 37 and turning the deflecting prisms 36b and 36b' of the prism assembly 34b relative to each other about the vertical axis 37 to determine an optimum angle of incidence according to the surface roughness of the inspected tooth surface 10 or 10'.

It should be understood that, by the employment of the above-described arrangements (1), (2) and (3), a production of holograms as well as a detection of profile errors can be successively carried out with an article having a plurality of surfaces to be inspected, such as a gear having a plurality of tooth surfaces. Thus, the efficiency of profile error detection can be remarkably improved. Accordingly, the efficiency in inspection of gears at a gear machining shop or an inspection shop is greatly improved by applying the profile error detecting method of the present invention to the inspection of the profile of gears, namely, to the detection of profile errors in the tooth surfaces of gears with respect to a reference tooth profile, for example, an involute tooth profile.

Figure 7:
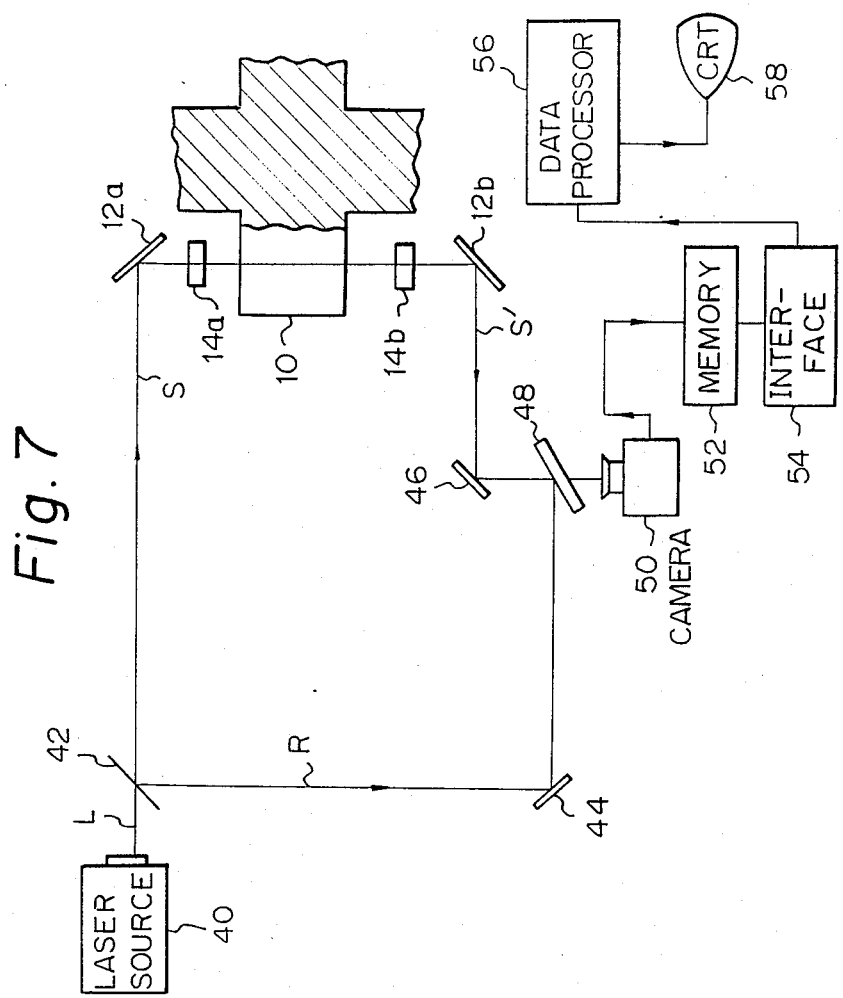
FIG. 7 is a diagrammatic view of an apparatus for optically detecting profile errors of a detected surface, incorporating therein an electronic computer system for carrying out data analysis.

FIG. 7 is a block diagram showing a profile error detecting and analyzing system employing the arrangement of FIGS. 2 through 4. This detecting and analyzing system executes a minute detection of profile errors over the entire area of a three-dimensional inspected surface, such as the inspected tooth surface 10 or 10', and analyzes data obtained through the detection of profile errors by applying a conventional data processing technique using a commercially available computer system simultaneously with the optical detection of the profile errors.

Referring to FIG. 7, a coherent light beam such as a He-Ne laser beam emitted by a laser light source 40 is separated by a half mirror 42 into a reference light beam R and a signal light beam S. The signal light beam S is transmitted further through a total reflection mirror 12a and a deflecting prism 14a and, as mentioned with reference to FIGS. 2 through 4, is projected on an inspected surface 10 for regular reflection. A reflected signal light beam S' reflected from the inspected surface 10 is transmitted through a deflecting prism 14b and a total reflection mirror 12b. The reflected signal light beam S' is then reflected by a total reflection mirror 46 and projected onto a photosensitive material 48 held at a fixed position. On the other hand, the reference light beam R is reflected by a total reflection mirror 44 and brought to the photosensitive material 48. Thus, the hologram of the inspected surface 10 can be produced on the photosensitive material 48. At this stage, the inspected surface 10 is initially replaced with a reference surface to produce the hologram of the reference surface, namely, a reference hologram, on the photosensitive material 48, and then the photosensitive material 48 is developed. The developed reference hologram is placed again at the same position, and then an objective inspected surface 10 is placed at the detecting position where the reference surface was placed. Then, the specularly reflected light beam S' reflected by the inspected surface 10 is projected onto the photosensitive material 48 carrying thereon the reference hologram. In this state, interference fringes can be taken by projecting the image of the detected surface 10, by using taking lens of an image taking device, such as a TV camera 50, onto a screen and by taking the image formed on the screen. The image data of the interference fringes is stored temporarily in a memory means 52 consisting of an image frame memory. Then, the image data of the interference fringes stored in the memory means 52 is applied through an interface 54 to a data processor 56 for analysis to evaluate the entire area of the inspected surface in comparison with the reference profile. If necessary, the results of the analysis can be displayed, for example, on a CRT device 58 or a well-known plotting device, not shown.

The evaluation of the entire area of the inspected surface 10 or 10' through the analysis of the data by a computer system enhances the accuracy of determination of the functions and performance of an industrial product in which the detected surface per se, such as a tooth surface of a gear, is a mechanically operative element, and therefore is very advantageous.

In observing interference fringes, sensitivity to a profile difference of each of the interference fringes along a line normal to the surface (hereinafter referred to as "fringe sensitivity P") is, as well known, expressed by $$P = \lambda/\cos\theta \qquad (1)$$

where $\lambda$ is the wavelength of the coherent light beam (laser beam), and $\theta$ is the angle of incidence of the signal light beam S on the inspected surface 10.

Therefore, according to the profile error detecting principle on which the present invention is based, the angle $\theta$ of incidence can be accurately determined by precisely producing the deflecting prisms 14 a and 14b each having the vertex angle $\lambda$ and, since the wavelength $\lambda$ of the laser beam is known, the fringe sensitivity P can be determined through calibration. Profile error data can be obtained by using the calculated fringe sensitivity P, and the profile of the inspected surface can be corrected on the basis of the profile error data thus obtained.

Figure 8:
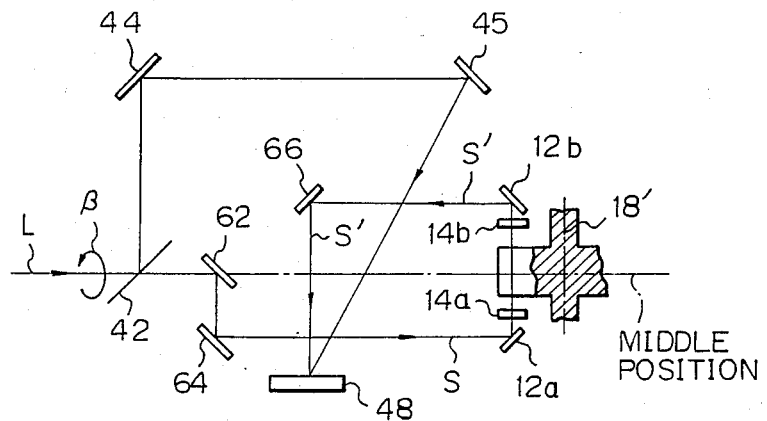
FIG. 8 is a diagrammatic view of an optical system incorporated into a profile error detecting apparatus of the present invention and capable of detecting errors in the tooth profiles of a helical gear.
Figure 9:
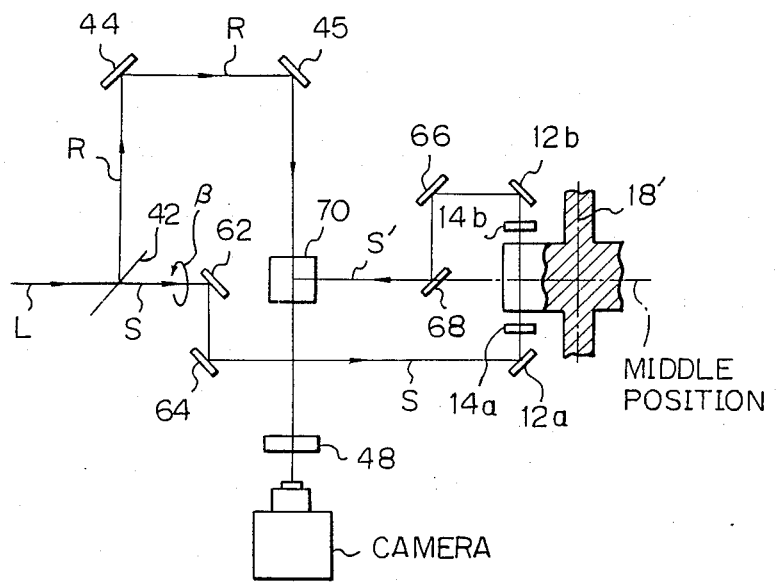
FIG. 9 is a diagrammatic view of an improved optical system compared with the system of FIG. 8 and incorporated into a profile error detecting apparatus of the present invention.

The surface of an inspected article, particularly, the tooth surface 10 of a gear, is not necessarily parallel with the axis of the rotary shaft 18 as shown in FIG. 2. That is, the tooth surfaces of a helical gear are inclined to the axis. Therefore, in some cases, it is impossible to project the signal light beam S on the tooth surface of the gear by transmitting the signal light beam S along the imaginary plane I parallel with the axis as illustrated in FIGS. 2 through 4. In such a case, it may be possible to project the signal light beam S onto the tooth surface by tilting the rotary shaft 18 so that the imaginary plane I is located opposite to the tooth of the helical gear. However, since the profile of the tooth surface is determined through the determination of the three-dimensional coordinates of the tooth surface with respect to the axis of the rotary shaft 18, it is not desirable to tilt the axis of the rotary shaft 18 serving as the canonical axis of the coordinates. Accordingly, the optical system must be operated to turn the imaginary plane I along which the signal light beam S is introduced so as to face the tooth of the helical gear, namely, the inspected surface. According to the present invention, a mechanism for such a purpose can be easily realized. FIGS. 8 and 9 are diagrammatic illustrations of assistance in explaining concrete embodiments of such a mechanism.

A mechanism illustrated in FIG. 8 will be described specifically as applied to detecting profile errors in a helical gear. Referring to FIG. 8, a coherent light beam L is projected from a point on a line passing the substantially middle point with respect to a tooth width of a helical gear and contained within a plane containing the axis 18' of the helical gear. The coherent light beam L is separated into a reference light beam R and a signal light beam S by a half mirror 42. The reference light beam R is projected through total reflection mirrors 44 and 45 onto a photosensitive material 48 removably held at a fixed position. The signal light beam S is transmitted through total reflection mirrors 62 and 64 along an imaginary plane containing the axis 18' of the helical gear and is projected onto a tooth surface at a large angle of incidence by a total reflection mirror 12a and a deflecting prism 14a. A reflected signal light beam S' reflected from the tooth surface is deflected by a deflecting prism 14b and a total reflection mirror 12b so as to travel along the imaginary plane, and then the reflected signal light beam S' is projected onto the photosensitive material 48 by a total reflection mirror 66. When an optical system comprising optical elements including the mirrors 42, 44, 45, 62, 64, 66, 12a and 12b, and the deflecting prisms 14a and 14b, is constructed so as to be turned about a line of projection of the coherent light beam L in a direction indicated by an arrow $\beta$, the imaginary plane can be turned according to the helix angle of the helical gear to position the imaginary plane opposite to a tooth surface of the helical gear. Accordingly, profile errors in the teeth of the helical gear can be detected on the same principle as that explained with reference to FIGS. 2 through 4 applied to detecting profile errors in the teeth of a spur gear. Since a laser light source which emits the coherent light beam may be disposed at a fixed position, the mechanism for turning the optical system can be formed with a comparatively simple construction.

FIG. 9 illustrates a modification of the mechanism of FIG. 8. The mechanism of FIG. 9 reflects the reflected signal light beam S' reflected by the total reflection mirror 66 again by a total reflection mirror 68 so that the reflected signal light beam S' travels on the same optical axis as the coherent light beam L, and then the reflected signal light beam S' is reflected by a fixed mirror 70 so as to fall on the photosensitive material 48 (hologram) together with the reference light beam R. In this arrangement, since the reflected signal light beam S' reflected from the tooth surface is transmitted so as to again travel on the same optical axis as the coherent light beam L when the optical system is turned about the optical axis of the coherent light beam L thereby allowing the signal light beam S to travel along the imaginary plane facing the tooth surface of the helical gear, the reflected signal light beam S' can be transmitted on the same axis regardless of the angle of turning of the optical system. Since the reflected signal light beam S' is reflected by the fixed mirror 70 on the photosensitive material 48 (hologram), an optical system for transmitting the reference light beam R and the photosensitive material 48 may be fixedly disposed. Naturally, a camera, i.e., means for taking interference fringes, provided behind the photosensitive material 48, and the data processing system may be arranged at fixed positions, respectively, as a matter of course. Accordingly, the mechanism for turning the optical system of the mechanism illustrated in FIG. 9 can be simpler in construction than that of the mechanism of FIG. 8.

Figure 10:
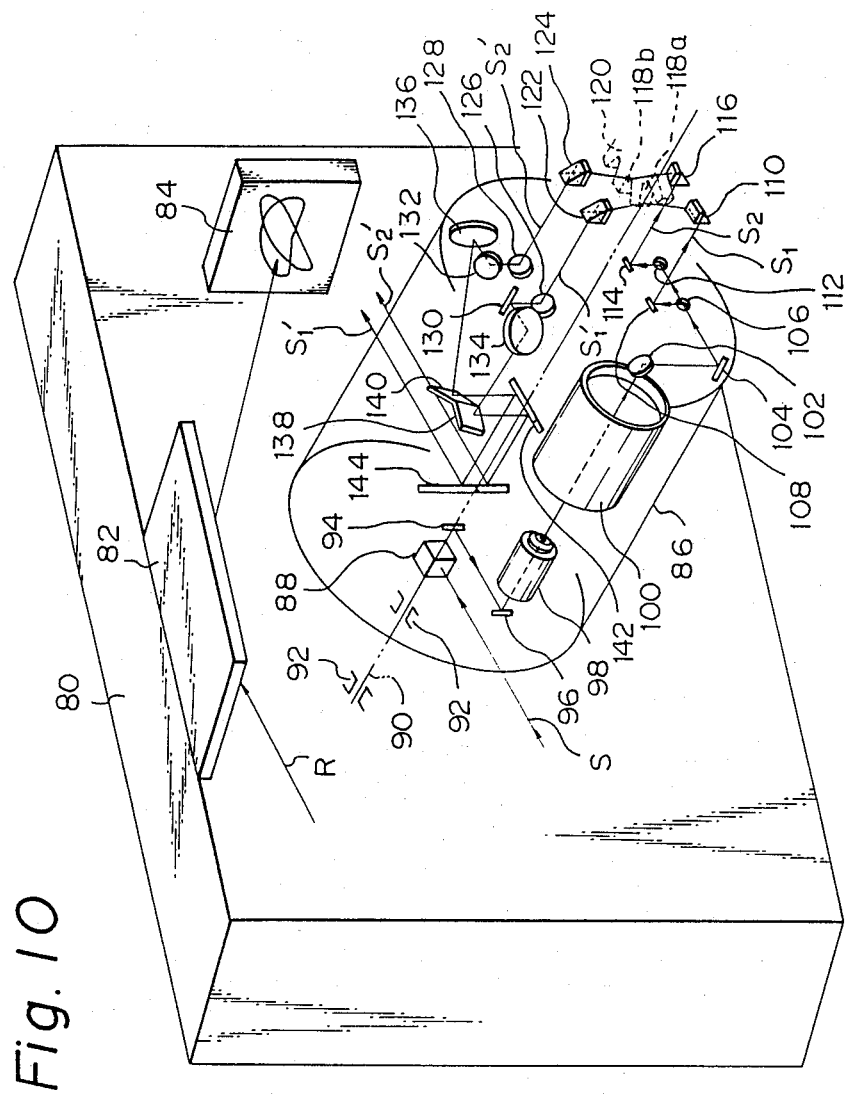
FIG. 10 is a schematically perspective view of a profile error detecting apparatus according to an embodiment of the present invention.

FIG. 10 is a perspective view of a profile error detecting apparatus for optically detecting profile errors in a surface of an article to be inspected according to a preferred embodiment of the present invention. This optical profile error detecting apparatus has the aforedescribed arrangement (1) to successively carry out an optical inspection of two consecutive surfaces for detecting profile errors in the two inspected surfaces.

Referring to FIGS. 10, a reference light beam R separated from a coherent beam of light is reflected on a holographic dry plate (or a photosensitive material) 84 by a reflecting mirror 82 stationarily held on a fixed frame 80. As mentioned above, the hologram of a reference surface analogous with the inspected surfaces is recorded on the holographic dry plate 84. Naturally, it is possible to produce the hologram of an inspected surface on a photosensitive material placed at the same position as the holographic dry plate 84.

A signal beam of light S is reflected by a reflecting mirror 88 fixedly mounted on a bracket fixed to the fixed frame 80 so as to travel along the central axis 90 of rotation of a hollow cylindrical support element 86. The support element 86 is a rigid member for supporting optical systems and is rotatably supported by rotational bearings 92. The signal light beam S entering into the support element 86 is first reflected by small mirrors 94 and 96 and subsequently expanded by light beam expanding lenses 98 and 100. The expanded signal light beam S is further reflected sequentially by reflecting mirrors 102 and 104 so as to travel toward an inspected article 120. When reflected by the reflecting mirror 104, the signal light beam S is separated into two signal light beams $S_1$ and $S_2$ by a half mirror 106. The signal light beam $S_1$ is reflected by a reflecting mirror 108 toward a deflecting prism 110, and the signal light beam $S_2$ is reflected by reflecting mirrors 112 and 114 toward a deflecting prism 116. The optical elements defining optical paths of the signal light beams S, $S_1$ and $S_2$ extending from the reflecting mirror 88 to the reflecting mirrors 108 and 114 are the components of an optical system for separating the light signal beam S into the light signal beams $S_1$ and $S_2$ and for transmitting the signal light beams $S_1$ and $S_2$ so that the signal light beams $S_1$ and $S_2$ travel finally along two parallel imaginary planes, not shown, extending opposite two inspected surfaces 118a and 118b of the inspected article 120, respectively. The deflecting prisms 110 and 116 are the components of an optical system for deflecting the signal light beams $S_1$ and $S_2$ in a direction perpendicular to the imaginary planes to project the signal light beams $S_1$ and $S_2$ respectively on the inspected surfaces 118a and 118b at a large angle of incidence suitable for utilizing the sheen phenomenon. The respective signal light beams $S_1$ and $S_2$ specularly reflected by the inspected surfaces 118a and 118b are subsequently deflected by deflecting prisms 122 and 124 in reflected signal light beams $S_1'$ and $S_2'$ so as to travel along the same imaginary planes, respectively. The reflected signal light beams $S_1'$ and $S_2'$ are transmitted through predetermined optical paths defined by reflecting mirrors 126 through 142 and, finally, are reflected by a reflecting mirror 144 fixedly provided at a fixed position separate from the support element 86 on the photosensitive material 84. Therefore, when a reference hologram, namely, the hologram of a reference surface, is placed at the position where the photosensitive material 84 is to be placed, first the inspected surface 118a is irradiated by the signal light beam $S_1$ and then the other inspected surface 118b is irradiated by the signal light beam $S_2$ to detect profile errors in these surfaces 118a and 118b sequentially by forming the respective interference fringes of the inspected surfaces 118a and 118b on a screen, not shown, taking the interference fringes and, as mentioned above, analyzing the interference fringes by a computer system. The holograms of both inspected surfaces 118a and 118b can be recorded simultaneously on the photosensitive material 84. Accordingly, when the inspected article is a gear, it is possible to detect and evaluate profile errors in the tooth surfaces of the gear continually at a high efficiency by using any pair of tooth surfaces of the gear as reference surfaces, and therefore, the efficiency of inspection at a gear machining shop and an inspection shop is improved. Particularly, when profile errors in the tooth surfaces of a helical gear are inspected and detected, it is possible to set the two imaginary planes respectively accurately opposite to inspected surfaces without tilting the axis of the helical gear, only by turning the cylindrical support element 86 about the central axis 90 of rotation through an appropriate angle to tilt the imaginary planes at an angle corresponding to the helix angle of the helical gear.

A rotative driving means for turning the rotary support element 86 may employ a conventional rotary stepping motor or a conventional linear stepping motor. When a linear stepping motor is employed, a wire or rope having one end fixed to the moving element of the linear stepping motor is wound around the support element 86 to rotate the cylindrical support element 86. The other end of the rope is attached to the fixed frame 80.

Figure 11:
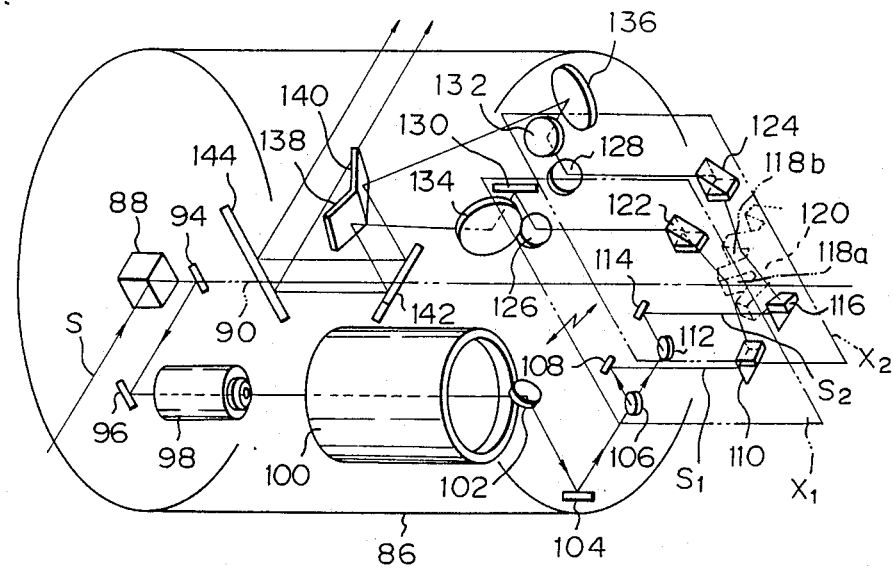
FIG. 11 is a part of the apparatus of FIG. 10, illustrating the construction and operation of a certain mechanism thereof.

Furthermore, as best illustrated in FIG. 11, according to the present embodiment, when the optical system defining the optical paths for the signal light beam $S_1$ which comprises the reflecting mirrors 106 and 108, the deflecting prisms 110 and 122 and the reflecting mirrors 126 and 134 is arranged in a plane $X_1$ indicated by alternate long and two short dashes lines in FIG. 11, and when the optical system defining the optical paths for the signal light beam $S_2$ which comprises the reflecting mirrors 112 and 114, the deflecting prisms 116 and 124 and the reflecting mirrors 128 and 132 are arranged in a plane $X_2$ indicated by alternate long and two short dashes lines in FIG. 11, it is possible to provide an appropriate actuating means for causing both planes $X_1$ and $X_2$ to relatively move toward and away from each other. As a result of this arrangement, the signal light beams $S_1$ and $S_2$ separated from the signal light beam S by the half mirror 106 may be projected onto the inspected surfaces 118a and 118b at a large angle of incidence so that the specularly reflected signal light beam $S_1'$ and $S_2'$ may always travel along the same imaginary planes according to a change in the extent of a space left between the opposite inspected surfaces 118a and 118b of the inspected article 120 (a gear).

Figure 12:
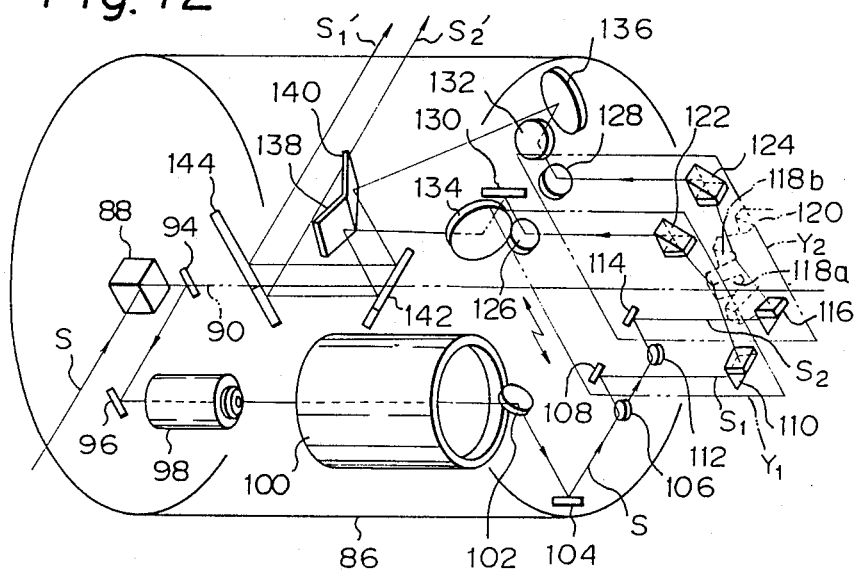
FIG. 12 is a part of the apparatus of FIG. 10, illustrating the construction and operation of another certain mechanism thereof.

Still further, when the reflecting mirror 108, the deflecting prisms 110 and 122 and the reflecting mirror 126 of the optical system for the signal light beam $S_1$ are arranged in a plane $Y_1$ indicated by alternate long and two short dashes lines in FIG. 12 and the reflecting mirror 114, the deflecting prisms 116 and 124 and the reflecting mirror 128 of the optical system for the signal light beam $S_2$ are arranged in a plane $Y_2$ indicated by alternate long and two short dashes lines in FIG. 12 so that the optical elements of the former optical system and those of the latter optical system can be moved in parallel with each other within the planes $Y_1$ and $Y_2$, the respective signal light beams $S_1$ and $S_2$ can be projected onto the two detected surfaces 118a and 118b of the inspected article 120 at positions that three-dimensionally correspond to each other, and can be reflected from the inspected surfaces 118a and 118b. The operational principles of the arrangements of FIGS. 11 and 12 will be described with reference to FIG. 13.

Figure 13:
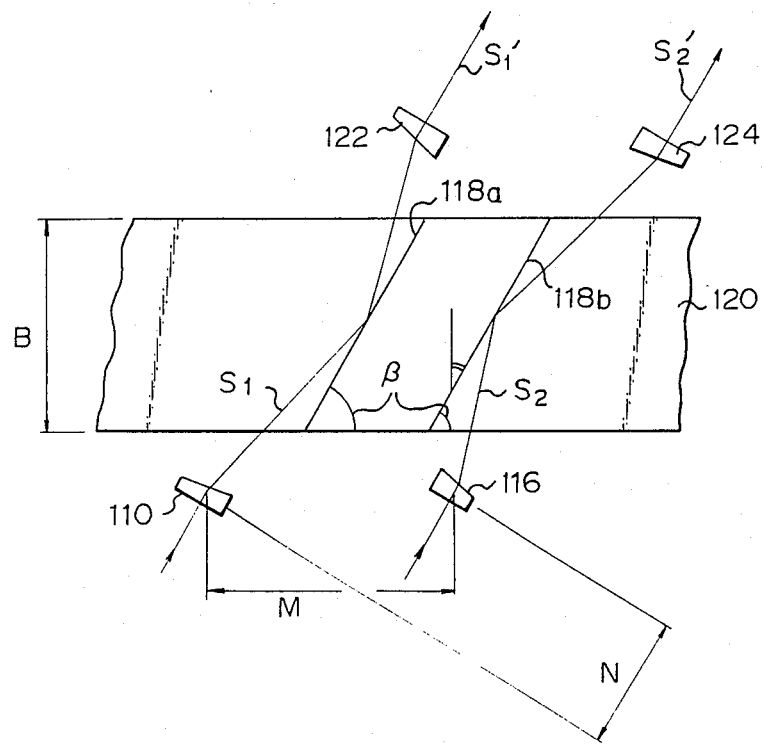
FIG. 13 is an explanatory view of the operating principle of the profile error detecting apparatus of FIGS. 11 and 12, in detecting profile errors of two detected surfaces having a variable distance therebetween.

Referring to FIG. 13, the paths of travel of the separated signal light beams $S_1$ and $S_2$ falling on and being reflected by the inspected surfaces 118a and 118b can be adjusted according to the variation of a distance M by moving the above-mentioned planes $X_1$ and $X_2$ respectively toward and away from the inspected surfaces 118a and 118b. The signal light beams $S_1$ and $S_2$ can be projected onto the inspected surfaces 118a and 118b at the same three-dimensional positions by moving the above-mentioned planes $Y_1$ and $Y_2$ relative to each other to adjust a distance N. Thus the signal light beams $S_1$ and $S_2$ can be projected respectively at optimum detecting positions on the surfaces 118a and 118b to obtain profile error data of these inspected surfaces.

When the inspected article is a helical gear, profile errors in a middle portion of each tooth surface, i.e., the boundary portion of the tooth flank and face, with respect to the tooth width B, which most significantly affect the gear performance of helical gears, can be detected by properly adjusting the optical systems according to the helix angle $\beta$ of the helical gear.

Figure 14:
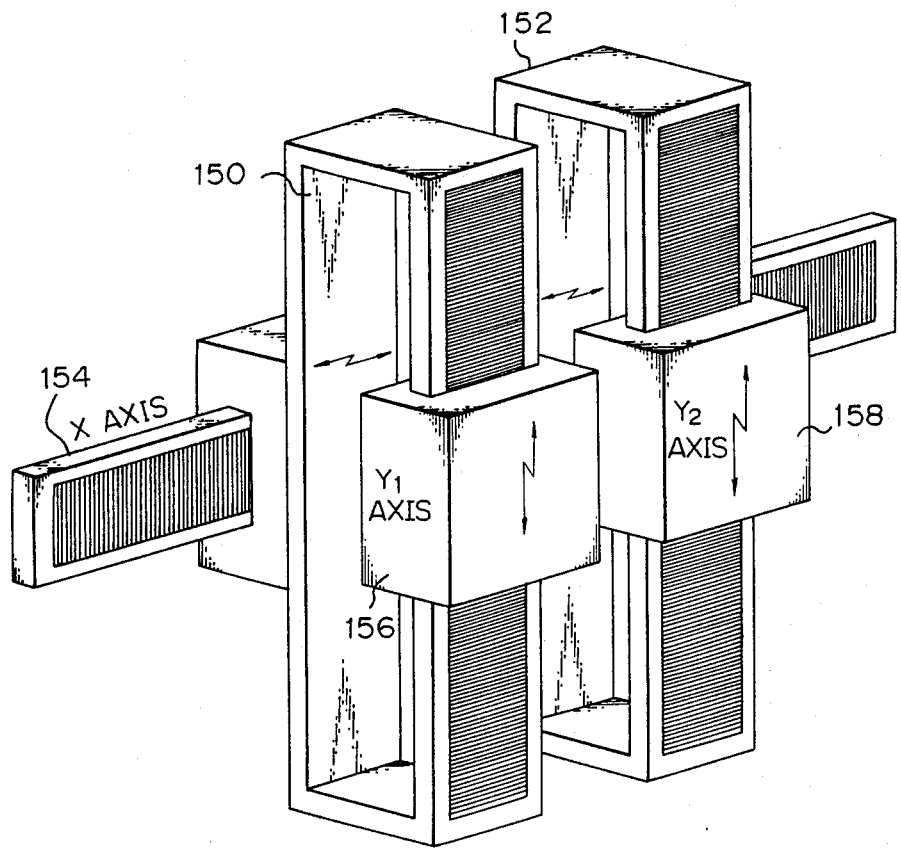
FIG. 14 is a perspective view of an example of a drive system employing stepping motors, adapted for moving support members to support the optical system of the profile error detecting apparatus according to the present invention.

FIG. 14 shows an embodiment of an actuating means for moving the planes $X_1$, $X_2$, $Y_1$ and $Y_2$ illustrated in FIGS. 11 and 12. Referring to FIGS. 14, two columns 150 and 152 are laterally slidably mounted on a fixed lateral girder 154 so as to be moved laterally toward and away from each other on a known linear stepping motor system, and two supporting members 156 and 158 are mounted respectively on the columns 150 and 152 so as to be moved vertically relative to the columns 150 and 152 on another known linear stepping motor system. With this construction, the columns 150 and 152 correspond to the planes $X_1$ and $X_2$ of FIG. 11, respectively, and the supporting members 156 and 158 correspond to the planes $Y_1$ and $Y_2$ of FIG. 11, respectively. Thus, the movement of the planes $X_1$, $X_2$, $Y_1$ and $Y_2$ can be precisely controlled on the operational principle of the linear stepping motor system.

Figure 15:
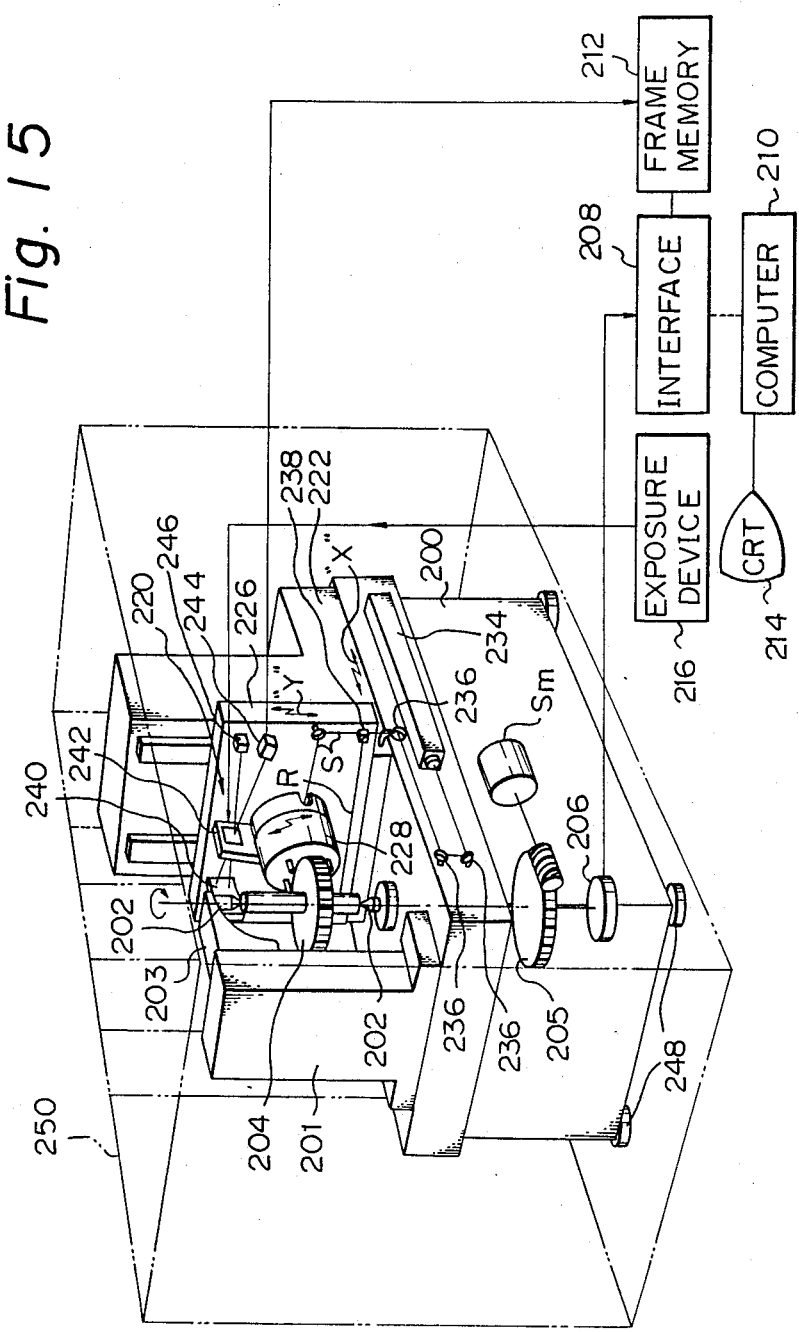
FIG. 15 is a perspective view of a tooth profile inspecting machine embodying the method of detecting profile errors of a detected object according to the present invention.

FIG. 15 is a perspective view of an optical profile error detecting apparatus for detecting profile errors in surfaces to be inspected, which is basically constructed on the basis of the arrangement and construction of FIGS. 10 through 14, and is adopted as a tooth profile error detecting apparatus.

Referring to FIG. 15, the tooth profile error detecting apparatus has a bed 200. A mandrel 202 supporting a gear 204 to rotate the same about the axis thereof is supported on the bed 200 by a bracket 203 attached to a column 201 fixedly mounted on the bed 200. The mandrel 202 is rotated through an indexing mechanism 205 by a servomotor Sm provided within the bed 200. A conventional rotary encoder 206 is arranged so as to cooperate with the indexing mechanism 205 for detecting the angular motion of the mandrel 202. The angular motion of the mandrel 202, and thus the angle of rotation of the gear 204, detected by the encoder 206 is transmitted via an interface 208 to an electronic computer system 210 consisting of a commercially available electronic micro computer. The computer system 210 controls the angle of rotation of the gear 204 on the basis of the data given thereto to index each inspected tooth surface of the gear 204 automatically sequentially at the detecting position.

A profile error detecting unit 220 according to the present invention is supported on a base block 222 which is mounted on the bed 200 at a position opposite to the mandrel 202. The base block 222 supporting the profile error detecting unit 220 is driven, for example, by a known driving mechanism employing a linear stepping motor for sliding movement toward and away from the mandrel 202 supporting the detected gear 204 along the upper surface of the bed 200 in directions indicated by a double-head arrow X. A detecting head supporting block 226 is supported on the base block 222 and is driven by a driving mechanism employing a linear stepping motor for vertical sliding movement in directions indicated by a double-head arrow Y. A rotary detecting head 228 is mounted on the detecting head supporting block 226. An optical detecting mechanism having the columns 150 and 152 and the supporting members 156 and 158 illustrated in FIG. 14, which support the optical systems and are driven by linear stepping motors, is accommodated inside the rotary detecting head 228. It should be noted that the rotary detecting head 228 corresponds to the rotary cylindrical support element 86 of FIG. 10 in function. Some deflecting prisms of the optical detecting mechanism project from the rotary detecting head 228 near to the inspected gear 204.

A He-Ne laser source 234 provided within the bed 200 generates a laser beam as a coherent inspecting beam of light. The laser beam is deflected by a plurality of reflecting mirrors 236 and is separated into a reference light beam R and a signal light beam S by a half mirror 238. The signal light beam S is led to the optical detecting mechanism provided within the rotary head 228. Then, the optical detecting mechanism carries out the optical detection of three-dimensional profile errors in the tooth surfaces of the gear 204, i.e., the inspected article, on the basis of the aforesaid profile error detection principle. The reference light beam R transmitted through appropriate optical paths is reflected by a reflecting mirror 240 corresponding to the reflecting mirror 82 of FIG. 10 on a photosensitive material 242 corresponding to the photosensitive material 84 of FIG. 10. Naturally, the signal light beam S emitted from the optical detecting mechanism falls on the photosensitive material 242. Thus, interference fringes are formed on the photosensitive material 242.

The interference fringes can be taken by a camera 244, and fringe data representing the interference fringes is stored temporarily in a frame memory 212. The fringe data is given through an interface 208 from the frame memory 212 to the computer system 210 for analysis. An exposure unit 216 is provided for producing a hologram of each inspected tooth surface. The results of analysis of the fringe data can be displayed on a CRT display 214 or can be copied in a hard copy by a copying unit, not shown. The camera 244 is provided with an optical sensor 246 for detecting the quantity of first order diffracted light diffracted by the hologram recorded on the photosensitive material 242.

The tooth profile error detecting apparatus in this embodiment is capable of detecting the three-dimensional profile of the tooth surfaces with reference to the hologram of a reference tooth surface irrespective of the form of gears, such as spur gears and helical gears, size or module of teeth and size of gears. Indicated at 248 in FIG. 15 are pneumatic dampers for preventing the influence of external disturbance such as external vibrations on the tooth profile error detecting apparatus. The tooth profile error detecting apparatus is housed in a large casing 250 having a door to prevent the influence of an optical external disturbance on the tooth profile error detecting apparatus.

From the foregoing description of the embodiments, it will be understood that, according to the present invention, errors in the three-dimensional profile of an inspected surface of a three-dimensional article, such as an industrial product, with reference to the three-dimensional profile of a reference surface can be optically detected without requiring contactual detection and the detecting operation can be carried out at a very high efficiency. Furthermore, profile errors in the surface to be inspected can be precisely analyzed through the analysis of the image of interference fringes produced by the interference between a diffracted light beam diffracted by a reference hologram and a specularly reflected signal light beam reflected by an inspected surface by the employment of a conventional computer system. Therefore, an improvement in the quality of the surface profile of industrial products can be achieved by supplying the results of analysis to machines for processing the industrial products. Still further, profile errors particularly in the three-dimensional tooth profile of various kinds of gears among industrial products can be accurately detected irrespective of the size of tooth space and the helix angle of tooth surface, which contributes remarkably to the improvement of gear machining processes. It should be understood that many modifications and variations will occur to a person skilled in the art without departing from the spirit and scope of the present invention claimed in the appended claims.

We claim:

1. A method of detecting profile errors of at least one surface of an article to be inspected with respect to a preselected profile of a reference surface by the use of an inspection light emitted from a light source, comprising the steps of:

separating a beam of the inspection light into a signal beam of light and a reference beam of light;

forwarding the reference beam of light toward a predetermined light sensitive material disposed of a fixed position;

forwarding the signal beam of light to the vicinity of the surface to be inspected by travel along an imaginary plane facing the surface to be inspected with a space therebetween under the guide of a first optical system;

changing the direction of travel of the signal beam of light to travel within the space in a second plane perpendicular to the imaginary plane facing the surface to be inspected by a second optical system thereby permitting the signal beam of light to fall on the surface to be inspected at a large angle of incidence and be reflected thereby;

passing the signal beam of light after reflection from the inspected surface through a third optical system which causes the signal beam of light to change the direction of travel to a direction in the imaginary plane facing the surface to be inspected;

projecting the signal beam of light traveling along the imaginary plane after passing through the third optical system on the light sensitive material disposed at the fixed position under the guide of a fourth optical system; and forming a hologram of the inspected surface on the light sensitive material through the interference between the signal beam of light and the reference beam of light which are projected on the light sensitive material, the hologram being used for detecting the profile errors of the inspected surface.

2. A method of detecting profile errors according to claim 1, wherein profile errors of a plurality of surfaces to be inspected are detected, further comprising the steps of:

disposing initially said reference surface at a position whereat said inspected surface is disposed so as to obtain the hologram of said reference surface;

replacing subsequently said reference surface with each of said plurality of inspected surfaces;

projecting a specularly reflected light beam of said signal beam of light reflected from said each inspected surface onto the hologram of said reference surface placed at said fixed position so as to form optical interference fringes on said light sensitive material; and analyzing said optical interference fringes thereby to detect said profile errors of said each inspected surface.

3. A method of detecting profile errors according to claim 2, further comprising the steps of:

taking an image of said optical interference fringes formed on said light sensitive material by a camera;

storing said image of said optical interference fringes in a storage means thereby enabling a computer system to analyze said image of said optical interference fringes stored in the storage means.

4. A method of detecting profile errors according to claim 1, wherein said inspected surface comprises one of a plurality of tooth surfaces of a gear mounted on a rotary shaft, said plurality of tooth surfaces being successively subjected to profile error inspection by rotating said gear by said rotary shaft.

5. A method of detecting profile errors according to claim 4, wherein said first, second, third and fourth optical systems are arranged within a round cylinder element having a single axis of rotation, and wherein, when said gear comprises one of helical and skew gears having an axis of rotation, said round cylinder element is turned in response to a helix angle of said helical and skew gears to thereby project said signal beam of light along said imaginary plane facing said surface to be inspected and said imaginary plane inclined at an angle relative to said axis of rotation of said gear as well as to allow said signal beam of light to travel in said second imaginary plane so that said signal beam of light falls on each helixed tooth flank at a large angle of incidence.

6. A method of detecting profile errors according to claim 1, wherein said reference beam of light and said signal beam of light are respectively forwarded to and projected on a light sensitive material comprised of a hologram recording plate member.

7. An apparatus for detecting profile errors of at least one surface of an article to be inspected with respect to a reference surface having a preselected profile comprising in combination:

light source means for emitting a coherent inspecting beam of light;

means for optically separating the inspecting beam of light into a reference beam of light and a signal beam of light;

light receiving material means removably arranged at a predetermined position adapted to receive the reference beam;

means for removably holding the inspected article having the surface to be subjected to a profile error detection at a predetermined inspection position;

first optical system means for allowing the signal beam of light to travel along an imaginary plane facing the surface of the article to be inspected with a space therebetween from said means for optically separating the inspecting beam to the vicinity of the surface to be inspected;

second optical system means for causing a change in a direction of travel of the signal beam of light and causing said signal beam of light to travel in a second plane perpendicular to the imaginary plane facing the surface of the article to be inspected and directing the signal beam of light to fall onto the surface of the article to be inspected at a large angle of incidence and be reflected thereby;

third optical system means for passing therethrough the signal beam of light specularly reflected from the surface of the inspected article so as to cause a change in a direction of travel of the specularly reflected signal beam of light to travel in a direction in the imaginary plane facing the surface of the article to be inspected;

fourth optical system means for projecting the specularly reflected signal beam of light passing through the third optical system onto the light receiving material means thereby forming a hologram of the surface of the inspected article on the light receiving material by an optical interference between the specularly reflected signal beam of light and the reference beam of light, the hologram being used for detecting the profile errors.

8. An apparatus according to claim 5, wherein a hologram of the reference surface is formed on said light receiving material means, and wherein said apparatus further comprises:

optical means for obtaining an image of interference fringes formed on said light receiving material means by irradiation of said hologram of said reference surface with said specularly reflected signal beam of light reflected from said surface of the inspected article;

memory means for storing said image of said interference fringes; and electronic analyzing means for analyzing profile errors in said surface of the inspected article with respect to said predetermined profile of the reference surface through analysis of said image of the interference fringes stored in said storage means.

9. An apparatus according to claim 8, wherein said optical means for obtaining an image of interference fringes comprise a camera.

10. An apparatus according to claim 7, wherein each of said second and third optical system means comprise a deflecting prism having a known angle of refraction.

11. An apparatus according to claim 7, further comprising a cylindrical holding means for holding therein said first and fourth optical system means, said cylindrical holding means being arranged to be capable of rotating about an axis of rotation thereof, thereby allowing said signal beam of light to travel along one of various different imaginary planes and to optically deviate said signal beam of light from said one of various different imaginary planes to travel in said second plane perpendicular to said one of various imaginary planes so that said signal beam of light may fall on anyone of various surfaces to be inspected at a large angle of incidence.

12. An apparatus according to claim 7 wherein said first optical system means comprise optical spectral means for separating said signal beam of light into a first signal beam of light and a second signal beam of light, and a group of optical incidence elements for allowing said first and second signal beams of light to travel along two different parallel imaginary planes respectively facing two different surfaces of said inspected article, wherein said second and third optical system means comprise two optical deflecting systems for respectively causing said first and second signal beams of light to fall on said two different surfaces of said inspected article at a large angle of incidence, and for respectively obtaining specularly reflected beams of said first and second signal beams of light reflected respectively from said two different surfaces of said inspected article, and wherein said fourth optical system means comprise two optical emission systems respectively projecting said two specularly reflected light beams obtained by said two deflecting optical systems toward said light receiving material means.

13. An apparatus according to claim 12, wherein said group of optical incidence elements of said first optical system means, said two optical deflecting systems of said second and third optical system means, and said two optical emission systems of said fourth optical system means form a right optical detecting system and a left optical detecting system arranged on right and left planes spaced apart from and parallel with each other, and wherein said apparatus further comprises an actuating means for moving said right and left optical detecting systems toward or away from each other and respectively along said right and left planes in order to allow said first and second light signal beams of light to fall at optimum positions on said surfaces of said inspected article, respectively.

14. An apparatus according to claim 7, wherein said means for removably holding the inspected article having the surface to be subjected to a profile error detection at a predetermined inspection position comprise a rotatably supported mandrel for mounting thereon a gear having a plurality of tooth surfaces which are to be subjected to profile error detection in a tooth profile thereof, and an indexing means for automatically indexing each of said plurality of tooth surfaces at said predetermined inspection position.

15. An apparatus according to claim 14, wherein said light source means for emitting a coherent inspecting beam of light comprise a laser source.

16. An apparatus according to claim 14, wherein said indexing means comprise a gearing mechanism for rotating said mandrel, a servo motor for driving said gearing mechanism, and a rotary encoder for detecting rotation of said mandrel, said rotary encoder being connected to said servo motor.

17. An apparatus according to claim 14, wherein a hologram of the reference surface that consists of a preselected reference tooth surface having a predetermined tooth profile is formed of said light receiving material means, and wherein said apparatus further comprises:

optical means for obtaining an image of interference fringes formed on said light receiving material means by irradiation of said hologram of said preselected reference tooth surface with said specularly reflected signal beam of light reflected from said surface of the inspected gear;

memory means for storing said image of said interference fringes; and electronic analyzing means or analyzing profile errors in said tooth surface of the inspected gear with respect to said profile of the reference tooth surface by analysis of said image of the interference fringes stored in said storage means.

18. An apparatus according to claim 7, wherein said light receiving material means comprises a hologram recording plate member.

* * * * *

UNITED STATES PATENT AND TRADEMARK OFFICE
CERTIFICATE OF CORRECTION

PATENT NO. : 4,910,561

DATED : March 20, 1990

INVENTOR(S) : TSUJIUCHI et al.

It is certified that error appears in the above-identified patent and that said Letters Patent is hereby corrected as shown below:

Column 15, line 40, "disposed of" should read -- disposed at --.

Signed and Sealed this

Fourth Day of June, 1991

Attest:

HARRY F. MANBECK, JR.

*Attesting Officer*          Commissioner of Patents and Trademarks